US012438839B2

(12) United States Patent
Catalano et al.

(10) Patent No.: US 12,438,839 B2
(45) Date of Patent: Oct. 7, 2025

(54) RULE-BASED MESSAGING AND USER INTERACTION SYSTEM

(71) Applicant: Snap Inc., Santa Monica, CA (US)

(72) Inventors: Jacob Catalano, Santa Monica, CA (US); Christie Marie Heikkinen, Sherman Oaks, CA (US); Vineet Kapil, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/429,028

(22) Filed: Jan. 31, 2024

(65) Prior Publication Data

US 2024/0267351 A1 Aug. 8, 2024

(30) Foreign Application Priority Data

Feb. 7, 2023 (IN) .............................. 202311007848

(51) Int. Cl.
*H04L 51/212* (2022.01)
*H04L 51/063* (2022.01)
(52) U.S. Cl.
CPC .......... *H04L 51/212* (2022.05); *H04L 51/063* (2013.01)
(58) Field of Classification Search
CPC ............................ H04L 51/212; H04L 51/063
See application file for complete search history.

(56) References Cited

U.S. PATENT DOCUMENTS

| | | | |
|---|---|---|---|
| 2012/0198017 A1* | 8/2012 | LeVasseur | H04L 63/0428 709/206 |
| 2016/0260176 A1* | 9/2016 | Bernard | H04L 51/08 |
| 2016/0330313 A1* | 11/2016 | Li | G06F 3/04845 |
| 2020/0327252 A1* | 10/2020 | Mcfall | G06F 21/78 |
| 2022/0179665 A1* | 6/2022 | Rathod | G06F 9/451 |

OTHER PUBLICATIONS

"Alternative Text", Office for Digital Accessibility (ODA), University of Minnesota, [Online]. Retrieved from the Internet: <URL: https://web.archive.org/web/20250114041208/https://accessibility.umn.edu/getting-started/learn-7-core-accessibility-skills/alternative-text>, (Archived on Jan. 14, 2025), 13 pgs.

(Continued)

*Primary Examiner* — Minh Chau Nguyen
(74) *Attorney, Agent, or Firm* — Schwegman Lundberg & Woessner, P.A.

(57) ABSTRACT

Some examples relate to a system and method for enhancing digital communication through a rule-based messaging and user interaction system. The system allows users to apply user-selected rules to messages, which dictate the conditions under which certain aspects of the message, such as images or text, are obscured or revealed. For example, a "reply to reveal" messaging mode may require a recipient to respond to the sender before a blurred image within the message becomes visible. The system includes a processor and memory that store the user-selected rules, apply the messaging mode to messages, and manage the transmission of such messages between user devices. This approach addresses the challenges of engaging users with varying degrees of digital literacy and encourages interactive communication by incentivizing responses through message content visibility conditions.

21 Claims, 14 Drawing Sheets

(56) References Cited

OTHER PUBLICATIONS

"Contrast Checker", WebAIM, web accessibility in mind, (Archived on Jan. 31, 2023), 2 pgs.
"Make apps more accessible", Apple Developers, [Online]. Retrieved from the Internet: <URL: https://web.archive.org/web/20230129035201/https://developer.android.com/guide/topics/ui/accessibility/apps>, (Archived on Jan. 29, 2023), 5 pgs.
"Supporting VoiceOver in your app", Apple Developer, [Online]. Retrieved from the Internet: <URL: https://developer.apple.com/documentation/uikit/supporting-voiceover-in-your-app>, (Retrieved on Apr. 10, 2025), 7 pgs.
"Text Legibility", Material Design, [Online]. Retrieved from the Internet: <URL: https://web.archive.org/web/20230107134917/https://m2.material.io/design/color/text-legibility.html#legibility-standards>, (Archived on Jan. 7, 2023), 16 pgs.

\* cited by examiner

RULE-BASED MESSAGING AND USER INTERACTION SYSTEM

CLAIM OF PRIORITY

This patent application claims the benefit of priority to Catalano et al, Indian (IN) Provisional Patent Application Ser. No. 202311007848, entitled "RULE-BASED MESSAGING AND USER INTERACTION SYSTEM," filed on Feb. 7, 2023, which is hereby incorporated by reference herein in its entirety.

BACKGROUND

With the increased use of digital communication, affordability of portable computing devices, availability of increased capacity of digital storage media, and increased bandwidth and accessibility of network connections, digital interactions and exchanges of messages including text and images have become a part of daily life for an increasing number of people. Nevertheless, some users, perhaps less familiar with increasingly sophisticated smart devices and their applications, remain hesitant or unable to interact meaningfully with the digital world.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
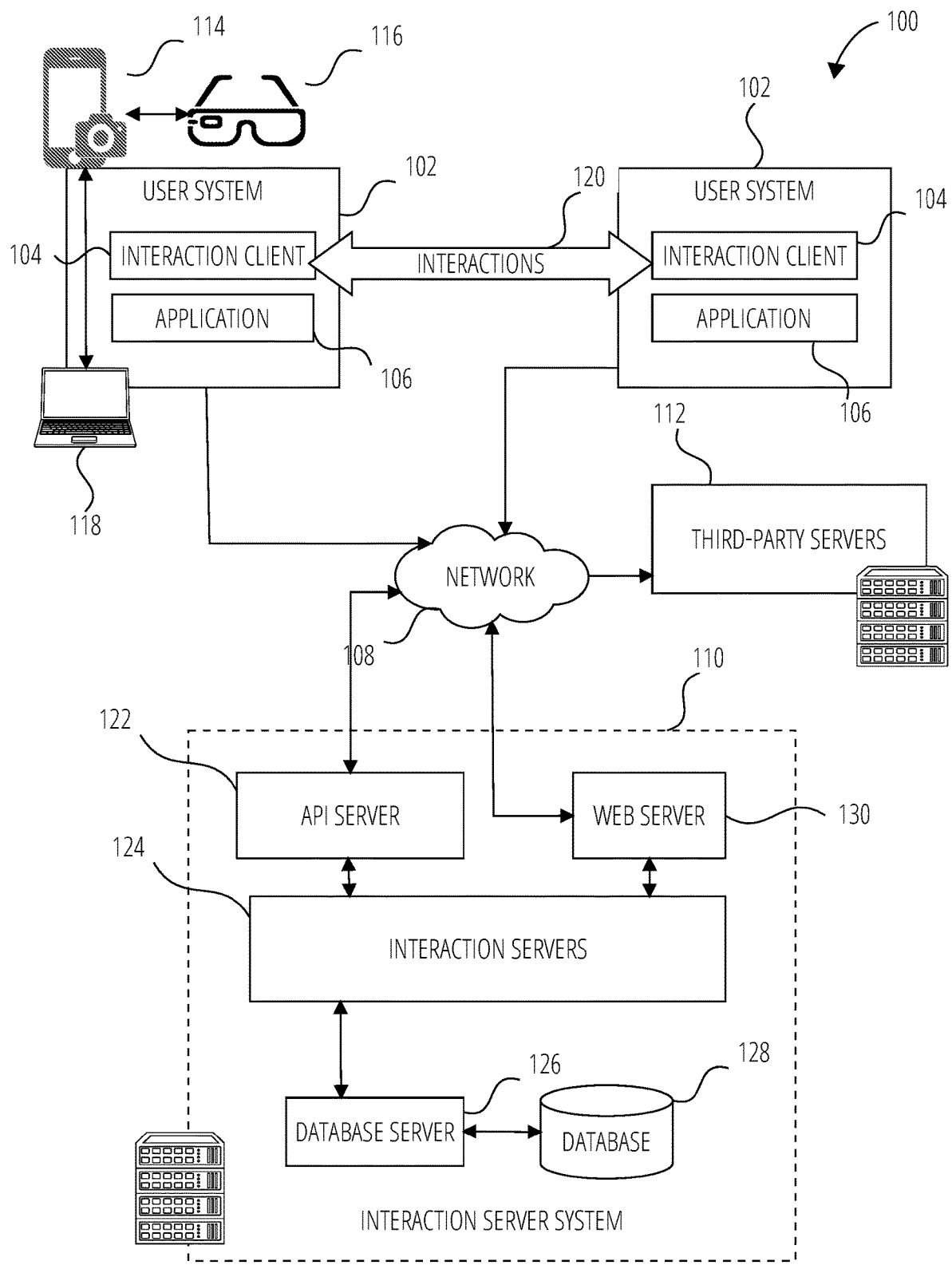
FIG. 1 is a diagrammatic representation of a networked environment in which the present disclosure may be deployed, according to some examples.

The present disclosure introduces an innovative rule-based messaging and user interaction system designed to facilitate and encourage interactive digital communication. The system incorporates a method for applying user-selected rules to messages, which can control the visibility of message content, such as text, images, or videos, based on the fulfillment of certain conditions. A notable feature of this system is the "reply to reveal" messaging mode, where message content is initially obscured and only becomes accessible upon the recipient's active engagement, such as sending a reply. The system's architecture includes client-side and server-side components that work in tandem to manage the application of messaging modes, the storage of user-selected rules, and the transmission of messages between users. This system is particularly beneficial for users with varying levels of familiarity with digital technology, as it simplifies the interaction process and promotes a more engaging communication experience. The patent application details the system's components, including databases, servers, and user interfaces, as well as the flow of operations that enable the unique messaging functionalities.

Viewed broadly, some examples allow users to set rules and select messaging modes for how messages are sent and reviewed. A messaging mode, based on a rule, may be established as a selectable messaging mode in a series of "messaging modes" that allow users to change the logic for how messages are sent, and how they are viewed (or rendered viewable) by a recipient. A selected messaging mode may be referred to as an "envelope" in some examples, and a series of messaging modes may be referred to as an "envelope of modes".

In some examples, a messaging application (such as an interaction client 104 or other applications 106 described further below) hosted on a client device (such as a mobile device 114 or computer client device 118 described more fully below) may be configured to enable a user to set one or more messaging modes, or rules. In some scenarios, a message recipient may be unfamiliar with a given messaging application or device, or may simply be unwilling or fearful to engage in a digital exchange of communications. For example, a young grandchild happily wishing to send birthday greetings to an elderly grandparent by way of a digital message may receive only stony silence as a reply if the grandparent is unfamiliar with the tools of the digital world. In other scenarios, a range of different participants in a chat group may have varying degrees of technical ability or confidence in participating in the group. Present examples enable the silent grandparent or reluctant users in the group, for example, to benefit from the use of messaging modes that enable or encourage a reply or fuller participation in the group. In further scenarios, through a lack of effort, shyness, or interest by one of the messaging parties, some online communications can tend to be a little one-sided. In addition to being helpful for people who are unfamiliar with how to use modern technology, some examples also address a common communication issue: people are busy and/or do not know what to send as a reply.

Present examples seek to address these digital communication difficulties and drawbacks and seek to provide easier ways for users to engage with each other in the digital world. Some present examples create a flow to encourage shared, real-time participation as a method of communicating.

In some examples, a messaging mode may be established by a user, typically a composer or sender of a digital message, to facilitate or encourage a reply to the digital message. In some examples, a user-selectable rule or messaging mode may be "conditional" in the sense that it includes satisfaction of a condition in order for the message to be read, or at least rendered visible.

In some examples, for instance including two friends communicating digitally with each other, a sender friend may invoke a "reply to reveal" messaging mode. Here, an original message sent by the sender friend to the recipient friend may include, for example, a blurred or unfocussed image that can only be viewed or rendered visible (for example, by an unblurring or focusing) by the recipient friend once the recipient friend replies to the sender friend with a message or image of their own, or "replies in kind", as it were. The original message sent by the sender friend may in some examples, further include or invoke a facilitation in sending a reply, for example opening the recipient's device in a "camera" mode, or other "ready for use" configuration. Use of the selected messaging mode can thus encourage and facilitate both friends to be active participants in the communication.

Some examples may include other messaging modes, rules, or conditions. Some examples enable a digital message composer to enhance creativity by selecting a messaging mode in advance of composing the text of a message, or appending an image to it. Some example messaging modes may be based on a rule or condition requiring, in order to "reveal" (or render visible or readable) an aspect of the message, the recipient to be in a particular location, or to be among the first to view or reply to a given message, or a waiting period or future date to view (such as a birthday). Some examples may facilitate the taking of a photographic or video recording and sending of the recipient's reaction to the original message as the readable or visible version of message is viewed. Although a specific "reply to reveal" example is described in this disclosure, it will be appreciated that other modes, rules, and conditions are possible in various configurations.

Networked Computing Environment

FIG. 1 is a block diagram showing an example interaction system 100 for facilitating interactions (e.g., exchanging text messages, sending images, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, images, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
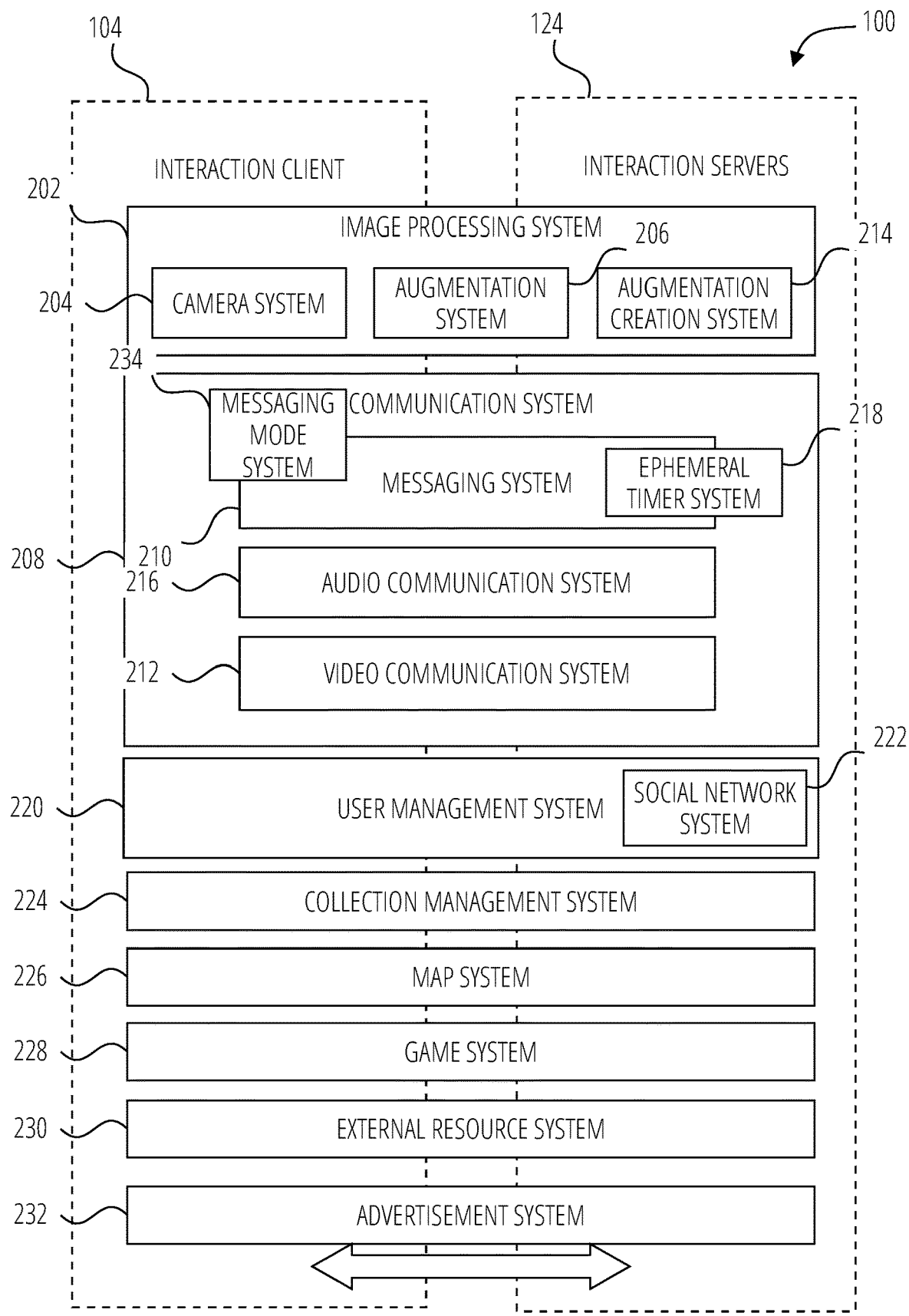
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104. The messaging system 210 incorporates a messaging mode system 234 that is responsible for enabling and processing user-selected messaging modes based on rules or conditions. Further details regarding the operation and example functions of the messaging mode system 234 are provided below.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
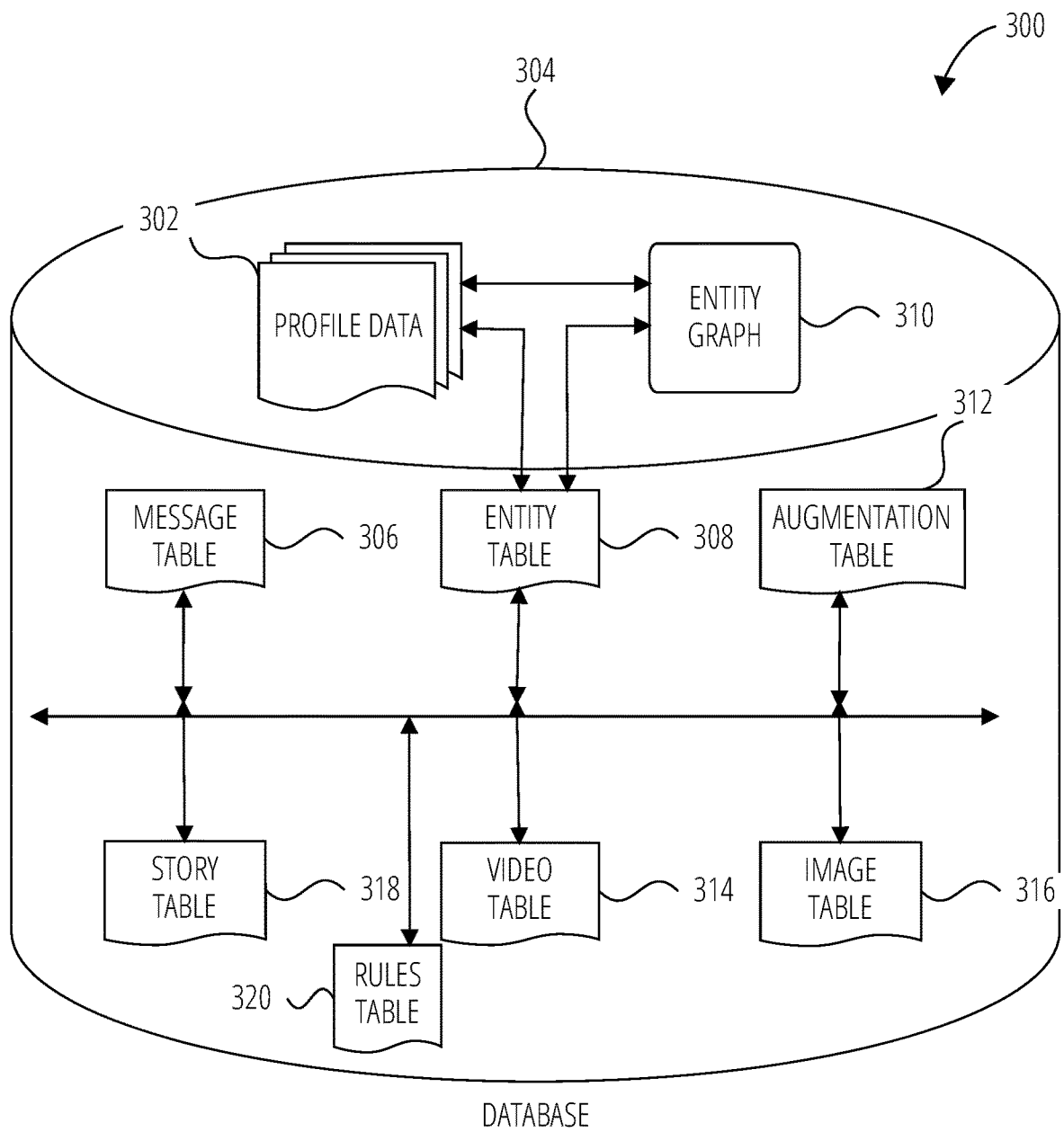
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also includes a rules table 320 that stores rules on which messaging modes enabled by the messaging mode system 234 may be based. Some example messaging modes may be based on a user-selected rule or condition requiring, in order to "reveal" or render visible or readable an aspect of a message, the recipient to send a reply to the message, or to be in a particular location when the message is sent or received, or to be the first or among a designated number of users to view or reply to the message, or a waiting period or future date. Other rules and/or conditions are possible.

Data Communications Architecture

Figure 4:
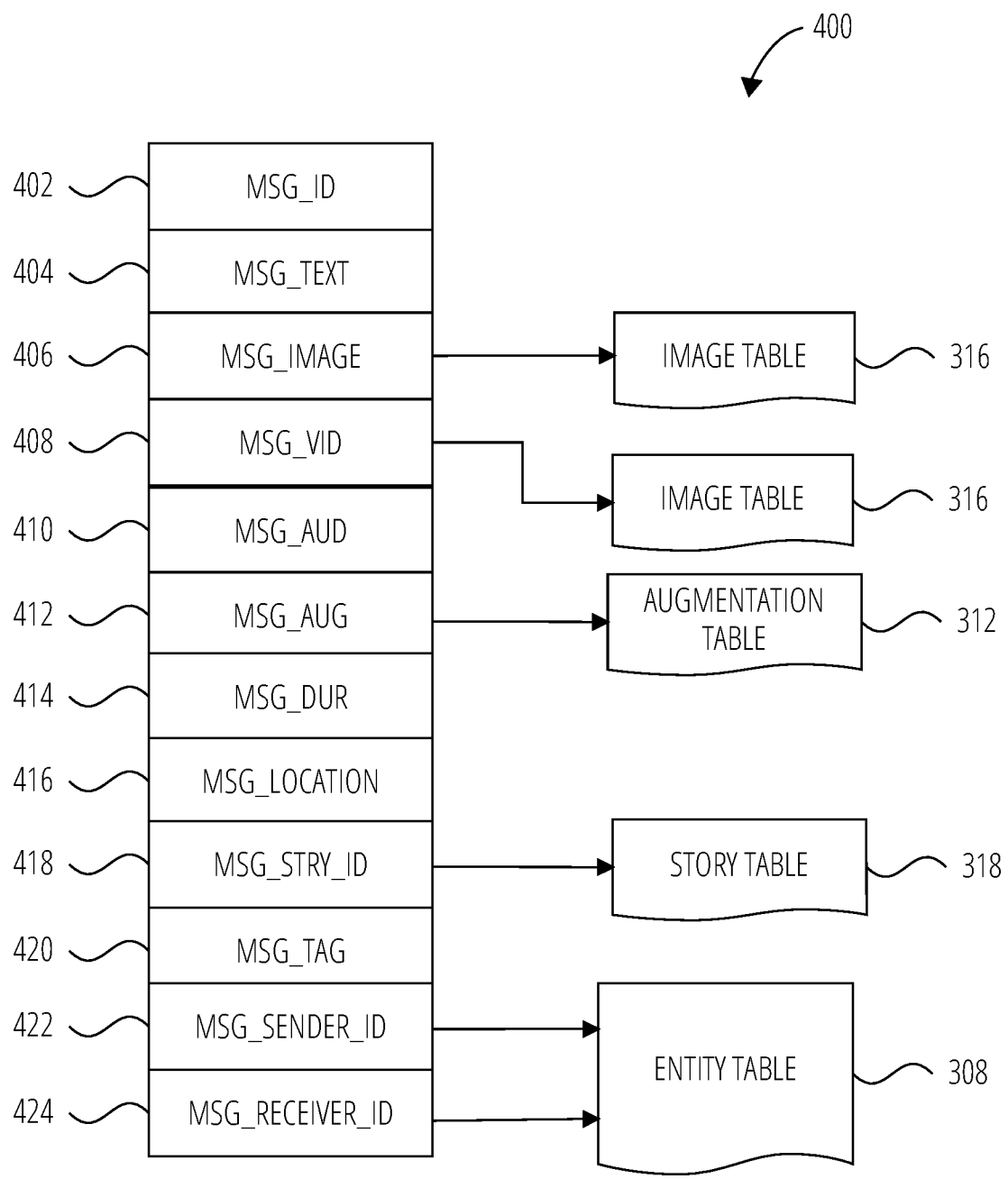
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316. In some examples, the messaging mode system 234 initially obscures, removes, or blurs the message image payload 406 in a message 400 in response to a selection or invocation of a messaging mode, such as a "reply to reveal" messaging mode discussed above. In some examples, the messaging mode system 234 un-obscures, adds back, or un-blurs the message image payload 406 when a rule or condition on which the messaging mode is based is satisfied, for example a response to the message is sent by the message recipient. In some examples, the messaging mode system 234 instructs or operates in conjunction with native software (such as iOS or Android) implementing on the mobile device 114 to obscure, remove, or blur the message image payload 406 in a message 400 in response to a selection or invocation of a messaging mode by a user. The native software may also be invoked by the messaging mode system 234 to un-obscure, add back, or un-blur (e.g., refocus) the message image payload 406 when a rule or condition on which the messaging mode is based is satisfied. In some examples, the messaging mode system 234 instructs or operates in conjunction with the image processing system 202 and/or the camera system 204 to obscure, remove, or blur the message image payload 406 in a message 400 in response to a selection or invocation of a messaging mode by a user. The image processing system 202 and/or camera system 204 may also be invoked by the messaging mode system 234 to un-obscure, add back, or un-blur (e.g., refocus) the message image payload 406 when a rule or condition on which the messaging mode is based is satisfied.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400. In some examples, the messaging mode system 234 initially obscures, removes, or blurs other aspects of the message 400 in response to a selection or invocation of a selected messaging mode. The other aspects of the message 400 may include the message video payload 408 and/or the message audio payload 410. In some examples, the messaging mode system 234 un-obscures, adds back, or un-blurs the other aspects (such as the message video payload 408 and/or message audio payload 410) when a rule or condition on which the messaging mode is based is satisfied.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

System with Head-Wearable Apparatus

Figure 5:
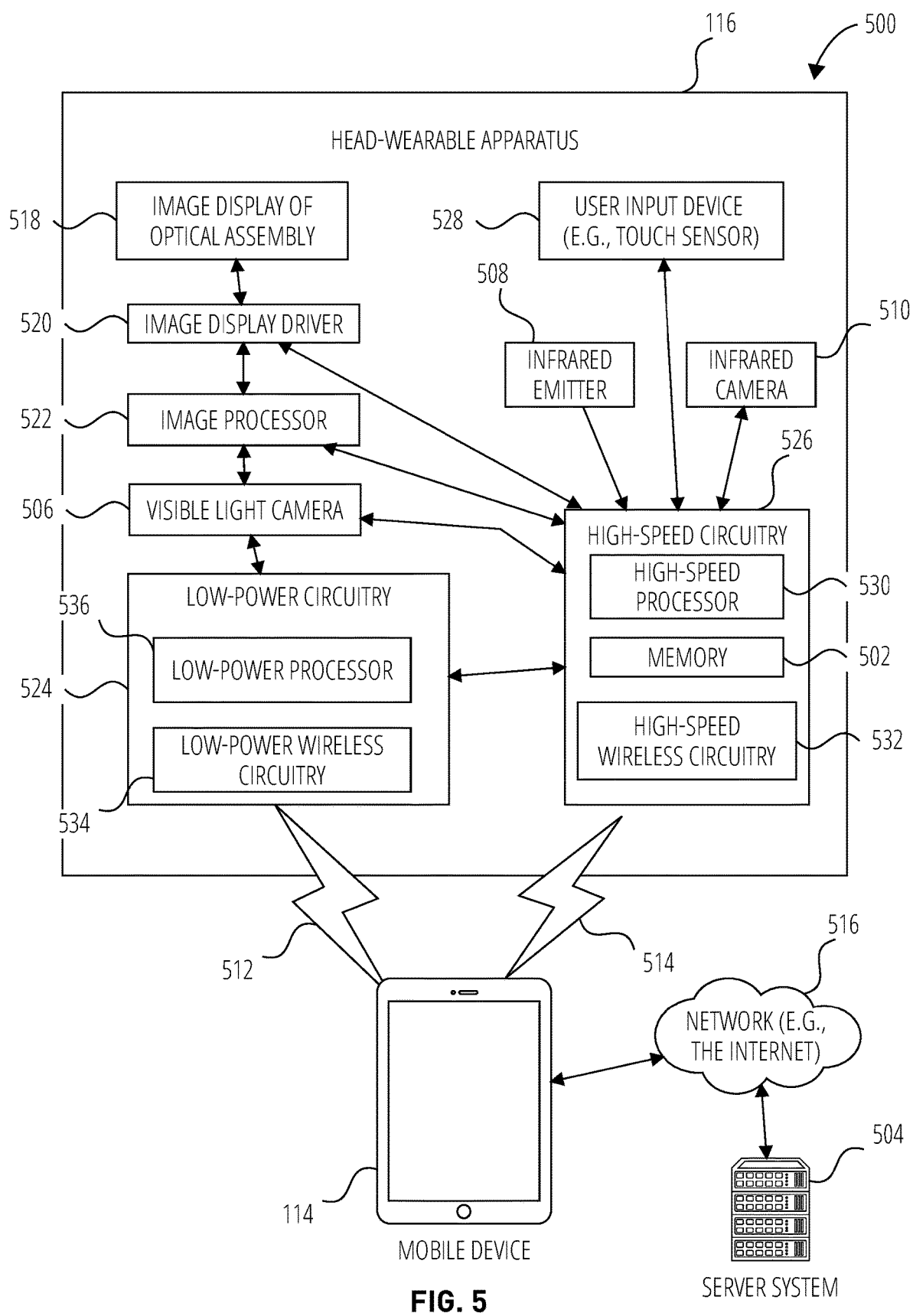
FIG. 5 illustrates a system including a head-wearable apparatus, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a mobile device 114 and various server systems 504 (e.g., the interaction server system 110) via various networks 108.

The head-wearable apparatus 116 includes one or more cameras, each of which may be, for example, a visible light camera 506, an infrared emitter 508, and an infrared camera 510.

The mobile device 114 connects with head-wearable apparatus 116 using both a low-power wireless connection 512 and a high-speed wireless connection 514. The mobile device 114 is also connected to the server system 504 and the network 516.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the mobile device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the mobile device 114 and the head-wearable apparatus 116.

The mobile device 114 includes a processor and a network communication interface coupled to the processor. The network communication interface allows for communication over the network 516, low-power wireless connection 512, or high-speed wireless connection 514. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 114 via the low-power wireless circuitry 534 or high-speed wireless circuitry 532.

Figure 6:
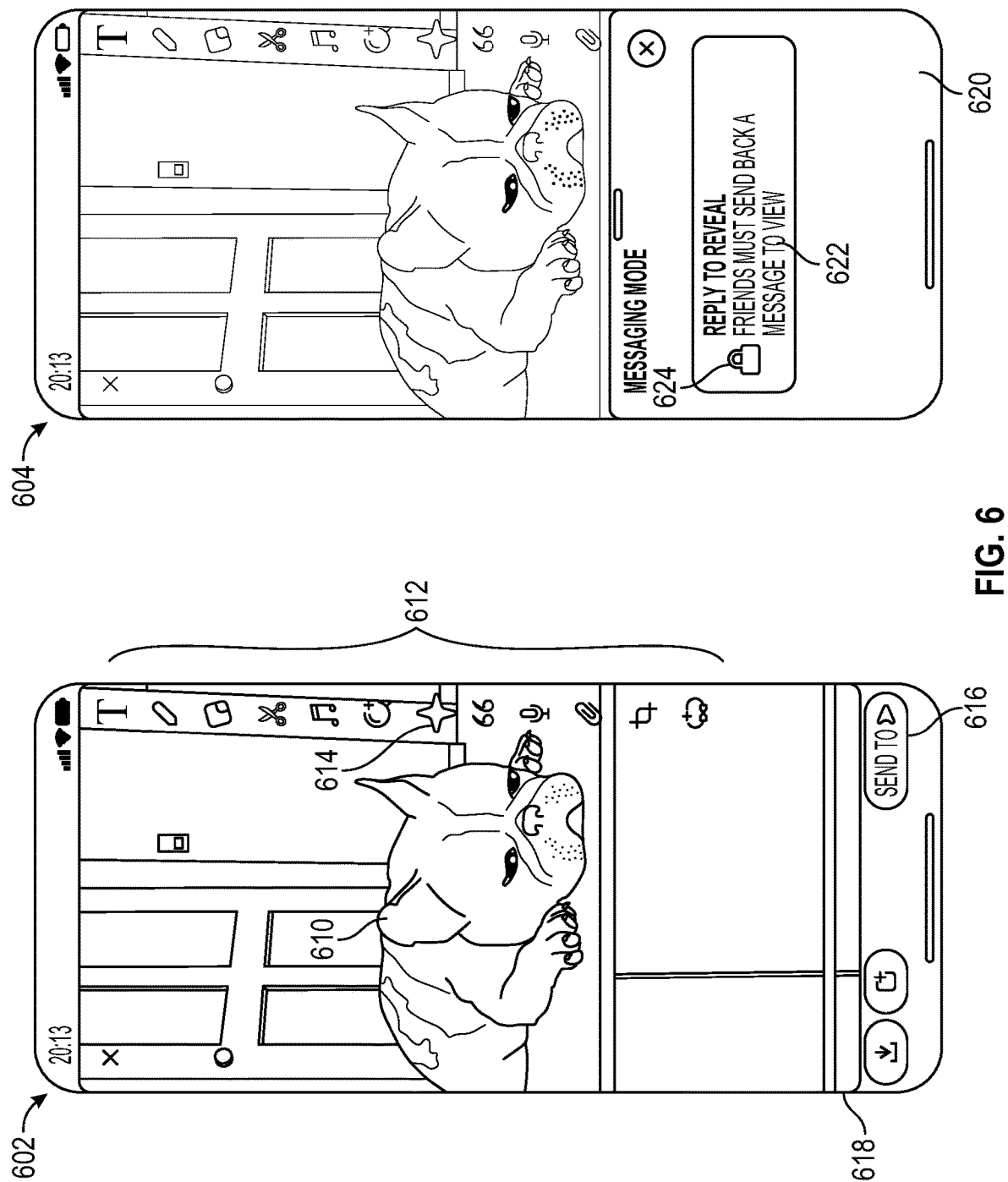
FIG. 6 depicts a series of example user interfaces, in accordance with various embodiments.
Figure 6:
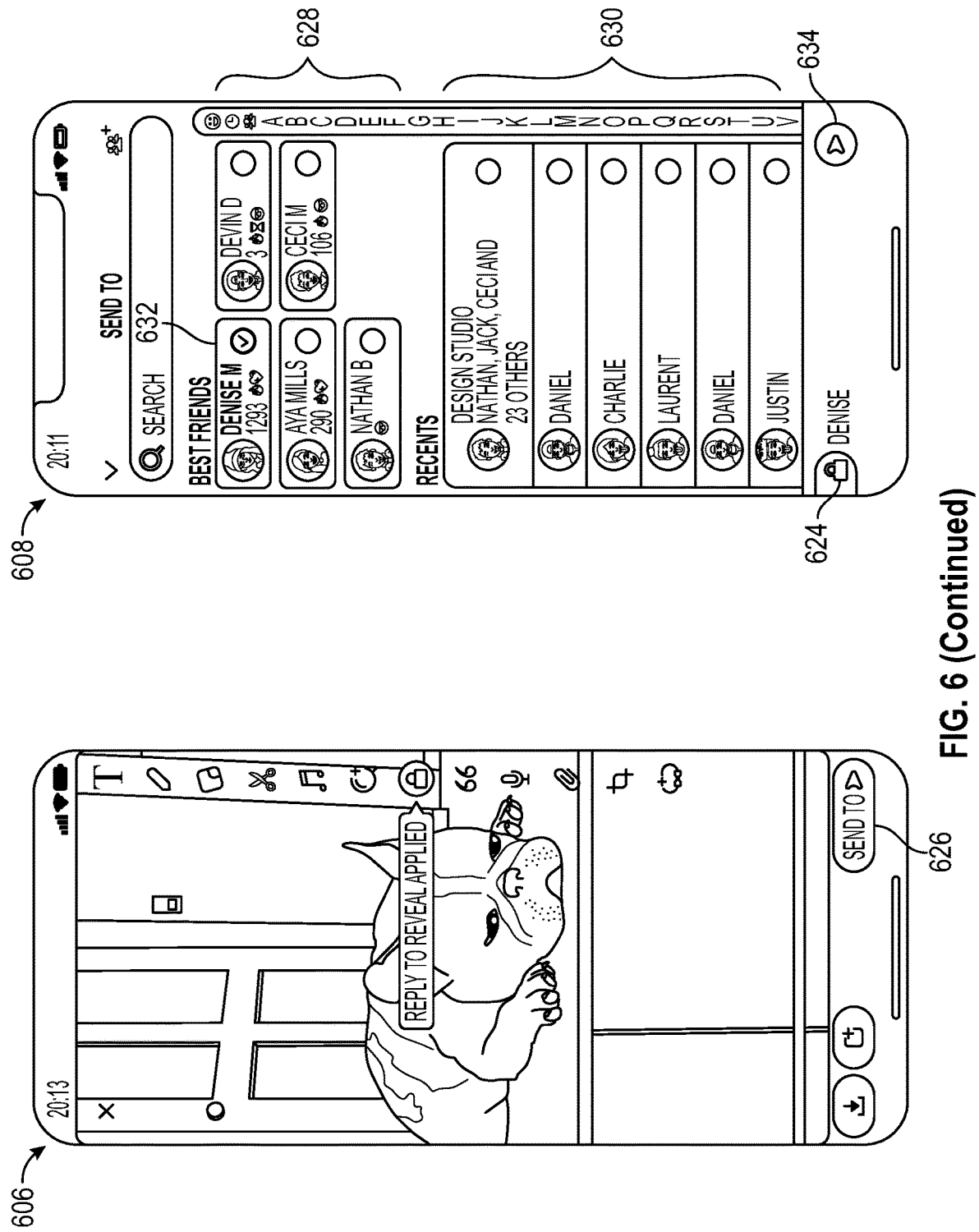
Figure 7:
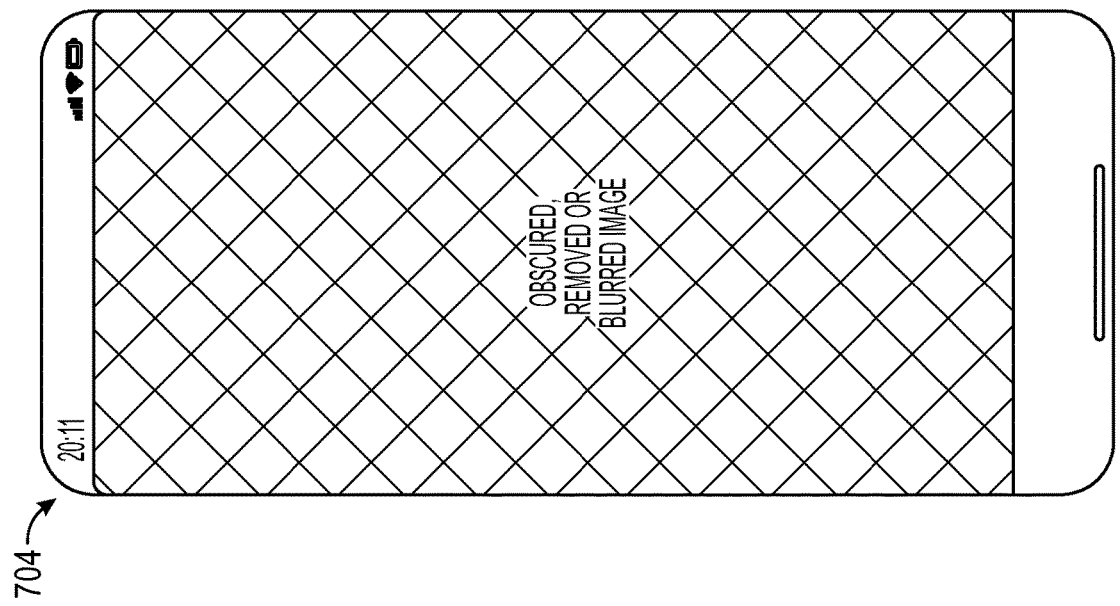
FIG. 7 depicts a series of example user interfaces, in accordance with various embodiments.
Figure 7:
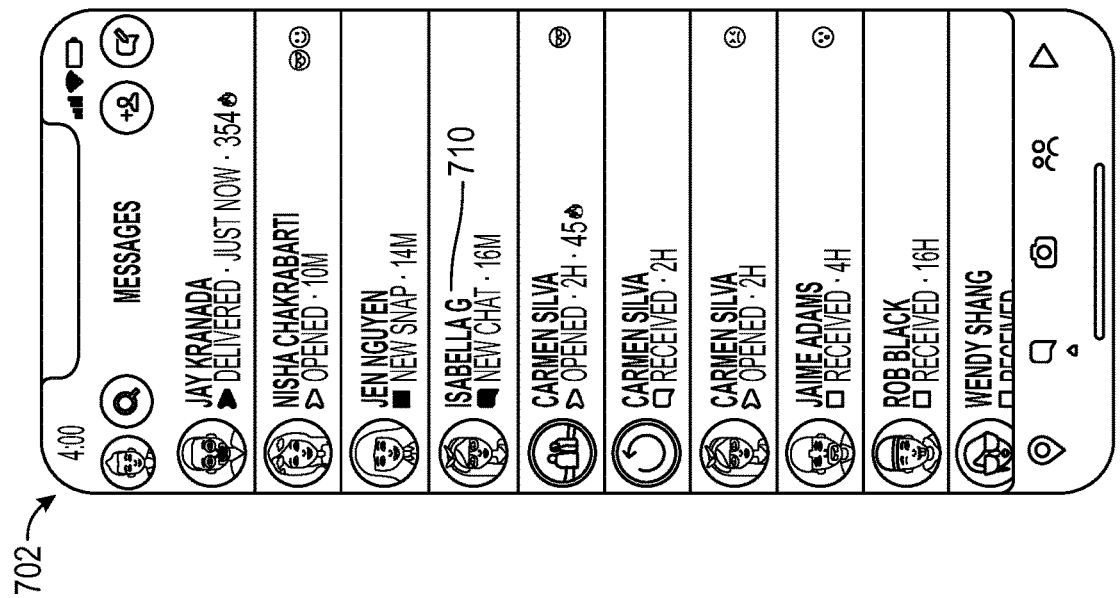
Figure 7:
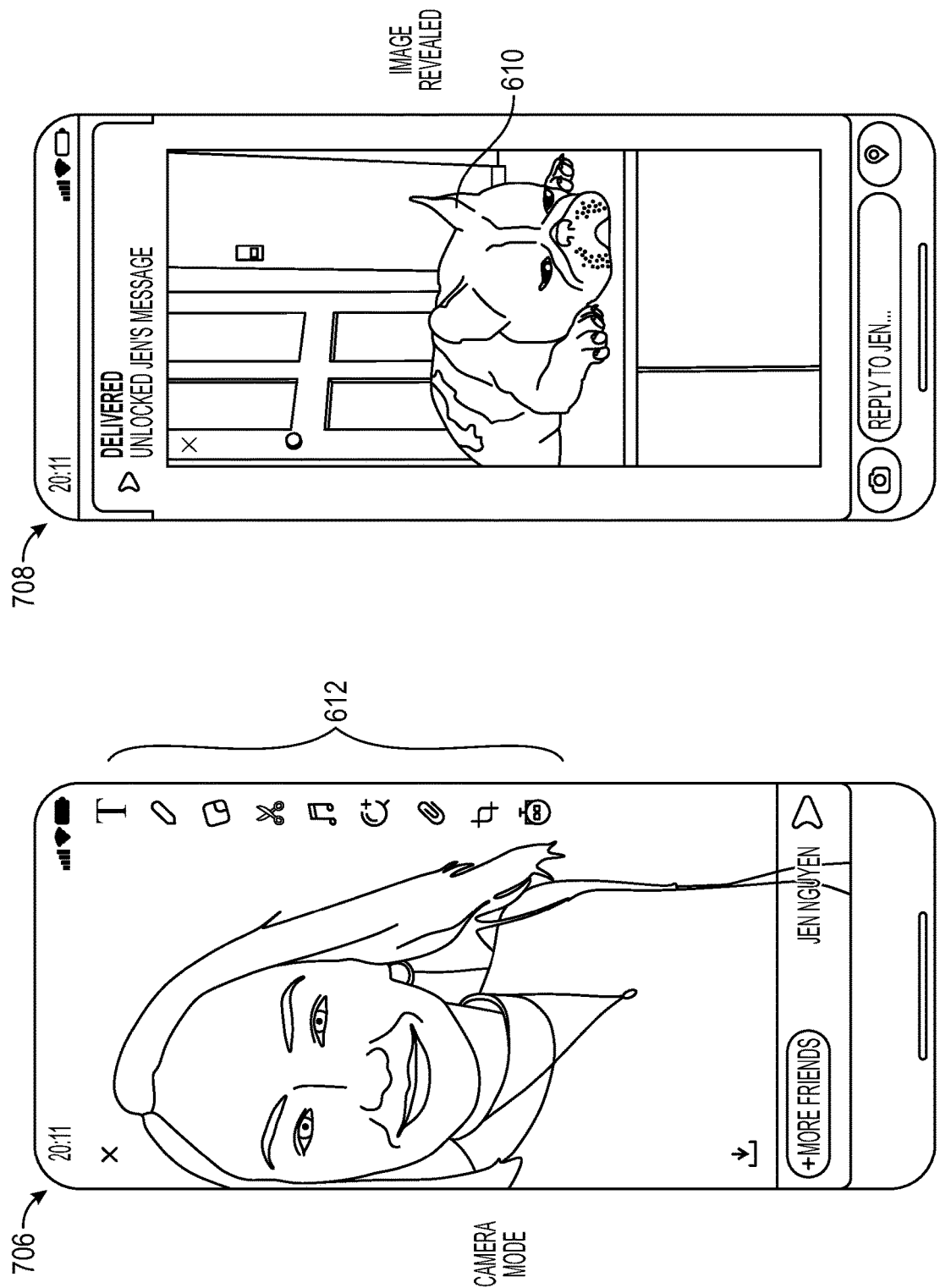
Figure 8:
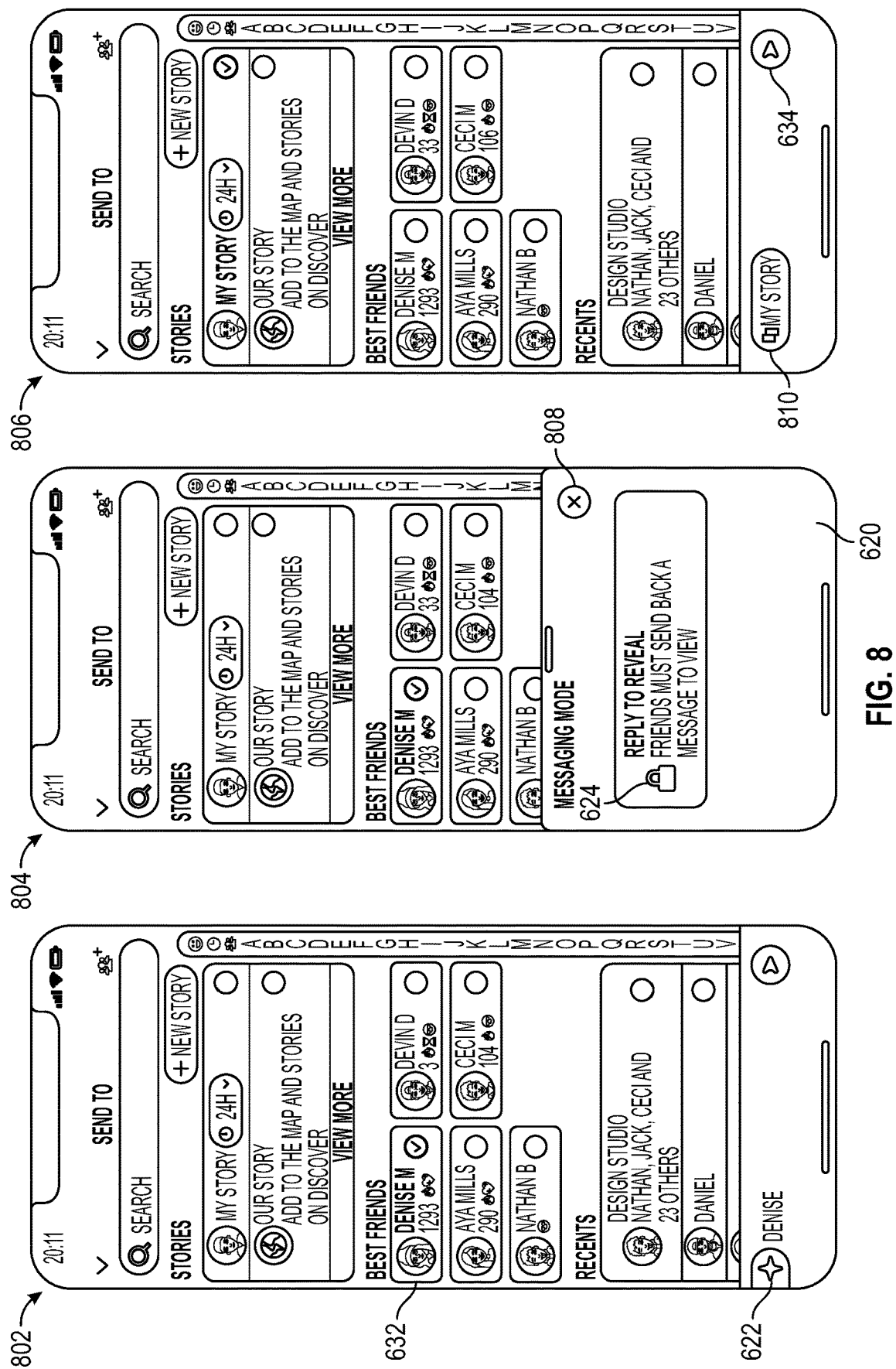
FIG. 8 depicts a series of example user interfaces, in accordance with various embodiments.

FIG. 6, FIG. 8, and FIG. 7 depict a series of example user interfaces, in accordance with various embodiments. In some examples, the series of example user interfaces is presented sequentially in the order shown for example during selection or invocation by a user of a messaging mode, and a response to the message by a recipient. The user interfaces may be presented in the mobile device 114, or the head-wearable apparatus 116, or the computer client device 118 of the message sender and the recipient, respectively.

FIG. 6 includes example user interfaces presented to a sender of a message, such as a message 400. In user interface 602 of FIG. 6, a user 701 can select a messaging mode for a message 400 to be sent to a recipient, for example a friend or another member of a chat group. The user interface 602 may be presented in the screen of a mobile device 114, head-wearable apparatus 116, or computer client device 118. The message 400 may include or be sent in association with an image 610, such as the illustrated dog on a bed. The image 610 may form part of a message image payload 406 described above.

The user interface 602 includes a range of configuration icons 612 by means of which components of a message 400, such as the image 610 (or other message image payload 406), or message audio payload 410, or message text payload 404 may be configured by the user. Among the configuration icons 612, a messaging mode icon 614 (in this case a "sparkle" icon) is provided. The messaging mode icon 614 can be selected by the user to invoke a messaging mode. The availability of the messaging mode may be associated with a premium subscription indicator 618. The messaging mode availability may be offered in a "preview" mode in which aspects of the messaging mode can be set by the user before the message 400 is composed or sent.

Selection of the messaging mode icon 614 launches the user interface 604. A tray 620 is presented in the user interface 604 and includes one or more messaging mode indicators 622. In the illustrated example, for simplicity only one messaging mode indicator 622 is presented for selection, but in other examples more message modes may be provided. In this illustrated example, a "reply to reveal" messaging mode is provided in the tray 620. The "reply to reveal" messaging mode may be associated with a padlock icon 624, as shown. As discussed above, the "reply to reveal" messaging mode may be based on a rule or condition that must be satisfied in order for an aspect of the message 400 to be revealed (or "unlocked" to be rendered readable, or visible) to a recipient of the message 400. In this example, the relevant aspect of the message 400 is the image 610, and the rule or condition that must be satisfied in order to have the image unlocked or revealed is a receipt by the sender of a reply or response to the message 400 from the recipient. The image of the padlock icon 624 is intended to be conceptually aligned with the locking and unlocking aspects of the "reply to reveal" mode.

Selection by the user of the messaging mode indicator 622 launches the user interface 606. Here, the messaging mode icon 614 has changed from a sparkle to the padlock icon 624 in visual confirmation of the selected messaging mode. The user interface 606 includes a send to icon 626 by means of which the user can select a recipient of the message 400 duly configured by the selected messaging mode.

Selection of the send to icon 626 by the user launches the user interface 608. In this view, the user is presented with a number of potential recipients of the configured message 400, such as best friends 628 and recent contacts 630. In the illustrated example, the user has selected "Denise" by clicking or tapping on best friend icon 632. The message 400 can be sent to Denise by selecting the send button 634. The message 400 is configured and sent, as indicated by the padlock icon 624 in the user interface 608, by applying the rule or condition of the selected messaging mode, in this case the "reply to reveal" messaging mode.

FIG. 7 includes example user interfaces now presented to a recipient (in this case Denise) of the message 400. In the user interface 702, the recipient receives an interactive new message notification 710. In the illustrated example, Denise has received a new message from the sender, in this case "Isabella G". Selection by Denise of the interactive new message notification 710 launches the user interface 704. But here, as will be seen, the image 610 associated with the message 400 is blurred. A clear image of the dog of image 610 cannot be discerned, or be seen in clear form. Conceptually, the message 400 and/or image 610 may be considered "locked". The message 400 was, however, sent under the "reply to reveal" messaging mode and so may be unlocked upon satisfaction of the applicable rule or condition, here the receipt by the sender (Isabella G) of a reply from the recipient (Denise).

In the user interface 706, the recipient uses the configuration icons 612 to compose a reply. In the present example, the recipient uses a camera mode of the device in which the message 400 is received to take a picture of herself and include the picture image in the reply. In some examples, an opening by the recipient of the message 400 received from the sender automatically invokes or launches a tool or application of the recipient device (for example an application on the recipient's mobile device 114, or head-wearable apparatus 116, or computer client device 118) on which the message 400 was received. The automatic launching can facilitate composition by the recipient of a reply to the message 400.

To this end, and in the illustrated example, the blurred image of the dog may be presented dynamically in the sense it is rendered to "dissolve" in the user interface 704 and be replaced with a camera view visible in the user interface 706. The image dissolution may terminate in association with a launch of a camera system (such as the camera system 204) of the recipient device to present the camera view. The recipient can now with greater ease compose an image-based reply to the message 400. Other types of device tools or applications can be launched in the recipient device automatically in further examples. A messaging interface or touch screen keyboard, for example, may be displayed to facilitate a quick reply from the recipient device.

In the current example the recipient has replied to the message, fully satisfying the applicable rule or condition of the governing messaging mode. In this instance, the recipient may indeed be said to have "replied in kind" (exchanged like for like, or image for image as the case here) but this type of reply is not necessarily required in some examples to satisfy the rule or condition. In some examples, a mere acknowledgement or other type or reply or response to the message 400 may suffice to satisfy the rule or condition of the applicable messaging mode.

In the user interface 708, because the recipient (Denise) has satisfied the rule or condition, the blurred image 610 of the dog is unblurred and rendered visible, as shown. In some examples, illegible text may be rendered legible. Other examples of rules or conditions governing a "locking" and "unlocking" of messages 400 are possible, as discussed further above. In some examples, receipt by the sender's device of the recipient's reply causes transmission of an instruction to the recipient device to unlock the message 400 as described above.

FIG. 8 includes a series of user interfaces (user interface 802, user interface 804, and user interface 806) illustrating another example entry point for a user to select a recipient for a message 400 configured by a messaging mode. Here, in the user interface 802, the recipient (Denise) is selected at best friend icon 632 before the messaging mode is selected. The messaging mode indicator 622 still appears as a sparkle accordingly, as shown. Selecting the messaging mode indicator 622 launches the user interface 804 in which a "reply to reveal" messaging mode indicated by the padlock icon 624 in the tray 620 may be selected, as before. The tray 620 can be closed by selecting the exit button 808 to launch the user interface 806. In some examples, instead of sending a "locked" message to a single recipient (e.g., a friend), a sender can elect to send a locked message to a broader group (such as a group of friends), or a story line. For example, the user interface 806 allows the user, by clicking the story icon 810, to append the "locked" image 610 to other content, such as a "story", or other historic online record. The image 610 can be appended to the story or other content by clicking the send button 634. In some examples, the messaging mode functionality is disabled if selected in conjunction with an incompatible option. Some examples may disallow adding locked images to a story, or other content, for example.

Figure 9:
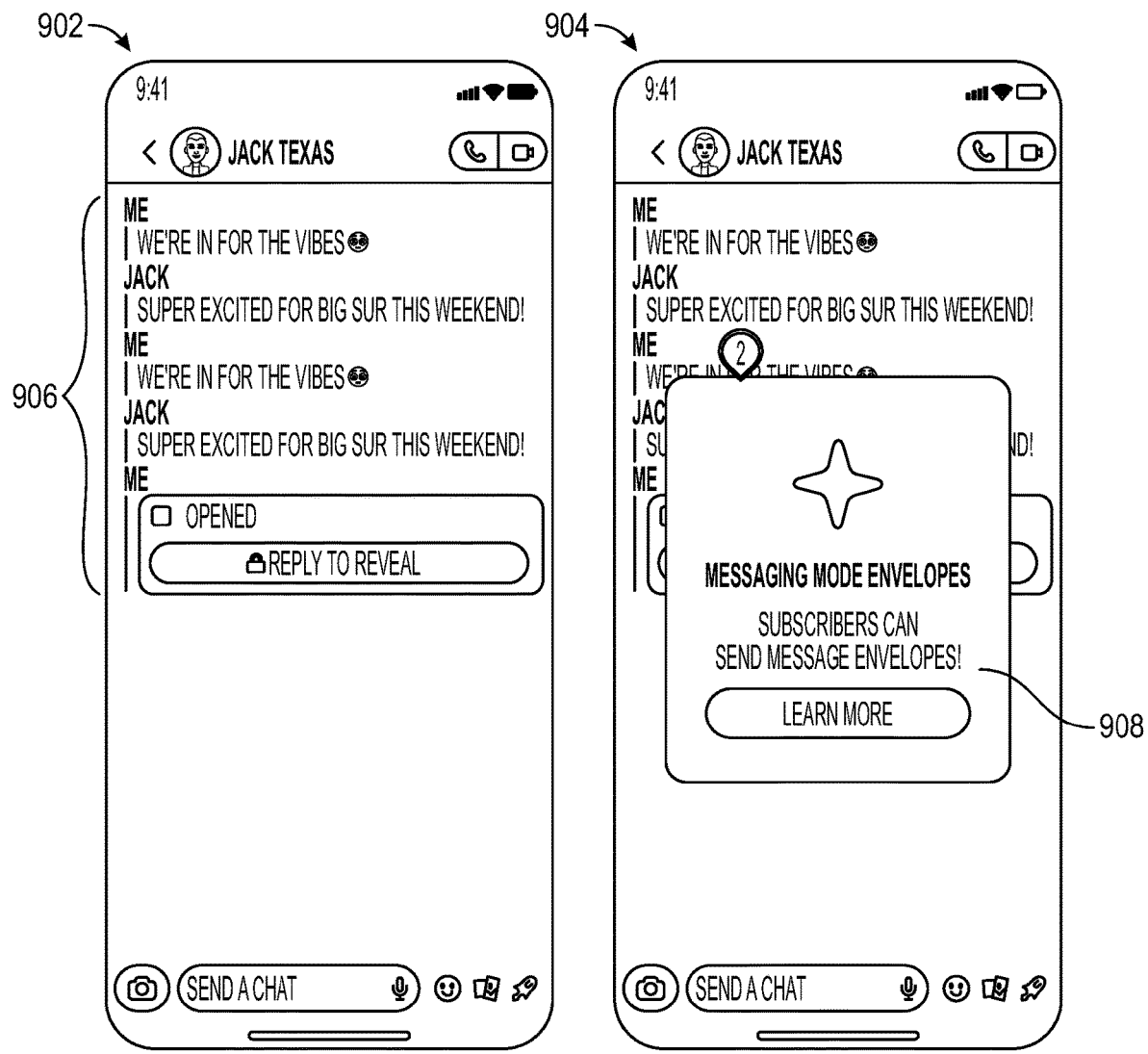
FIG. 9 depicts a series of example user interfaces, in accordance with various embodiments.

FIG. 9 depicts a series of example user interfaces (user interface 902 and user interface 904), in accordance with various embodiments. The user interface 902 and user interface 904 may be caused to be presented by the messaging mode system 234 in the course of an exchange of messages 906 between users to promote or facilitate use of the messaging mode, for example by subscribing to a premium messaging service as advertised by the messaging mode advertiser 908.

Figure 10:
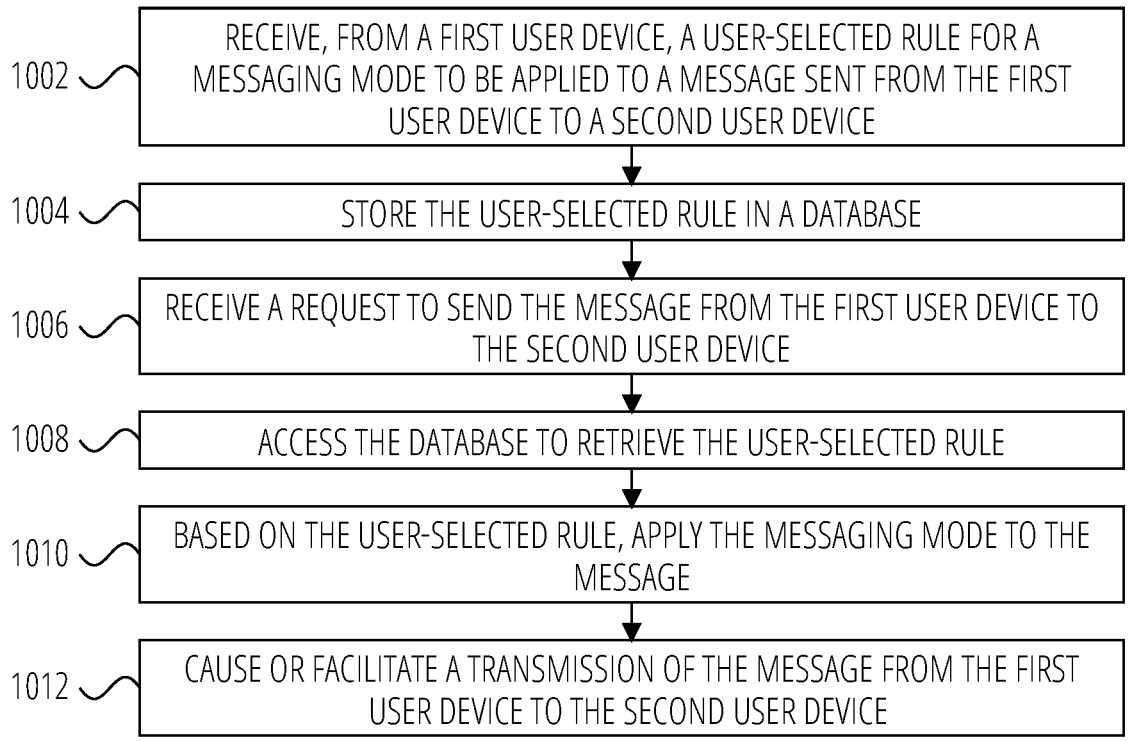
FIG. 10 is a flowchart illustrating a method, according to certain example embodiments.

FIG. 10 is a flowchart illustrating a method, according to certain example embodiments. The method may be embodied in computer-readable instructions for execution by one or more computer processors such that the operations of the method may be performed in part or in whole by the messaging mode system 234, or an application (e.g., application 106) executing on first user device such as the mobile device 114, Or the head-wearable apparatus 116, or the computer client device 118 and components thereof. Accordingly, the method 1014 is described below by way of example with reference thereto. However, it shall be appreciated that at least some of the operations of the method 1014 may be deployed on various other hardware configurations and the method 1014 is not intended to be limited to the messaging mode system 234 or any components or systems mentioned above.

The operations described in FIG. 10, in an embodiment, correspond to at least the description of operations as discussed above. In one aspect, a method, at an interaction system, includes receiving, from a first user device, a user-selected rule for a messaging mode to be applied to a message sent from the first user device to a second user device, storing the user-selected rule in a database, receiving a request to send the message from the first user device to the second user device, accessing the database to retrieve the user-selected rule, based on the user-selected rule, applying the messaging mode to the message, and causing or facilitating a transmission of the message from the first user device to the second user device.

The method may also include where the messaging mode includes an obscuring of an aspect of the message sent from the first user device to the second user device. Other technical features may be readily apparent to one skilled in the art from the following figures, descriptions, and claims.

The method may also include where the obscuring renders the aspect blurred, unreadable, invisible, or illegible to a user accessing the message at the second user device.

The method may also include where the user-selected rule includes a condition required to be satisfied by the user accessing the message at the second user device in order for the obscured aspect of the message to be unobscured and rendered unblurred, readable, visible, or legible to the user accessing the message at the second user device.

The method may also include where the obscured aspect of the message includes an image.

The method may also include where the condition required to be satisfied includes a receipt by the first user device of a reply to the message, the reply composed by the user accessing the message at the second user device and sent from the second user device.

The method may also include where the condition required to be satisfied further requires receipt of an image to be included in the reply to the message composed by the user accessing the message at the second user device.

The method may also include further includes obscuring the obscured aspect of the message based on a receipt by the first user device of a reply to the message, the reply to the message including an image thereby satisfying the condition required to be satisfied in order for the obscured aspect of the message to be unobscured. Other technical features may be readily apparent to one skilled in the art from the following figures, descriptions, and claims.

Machine Architecture

Figure 11:
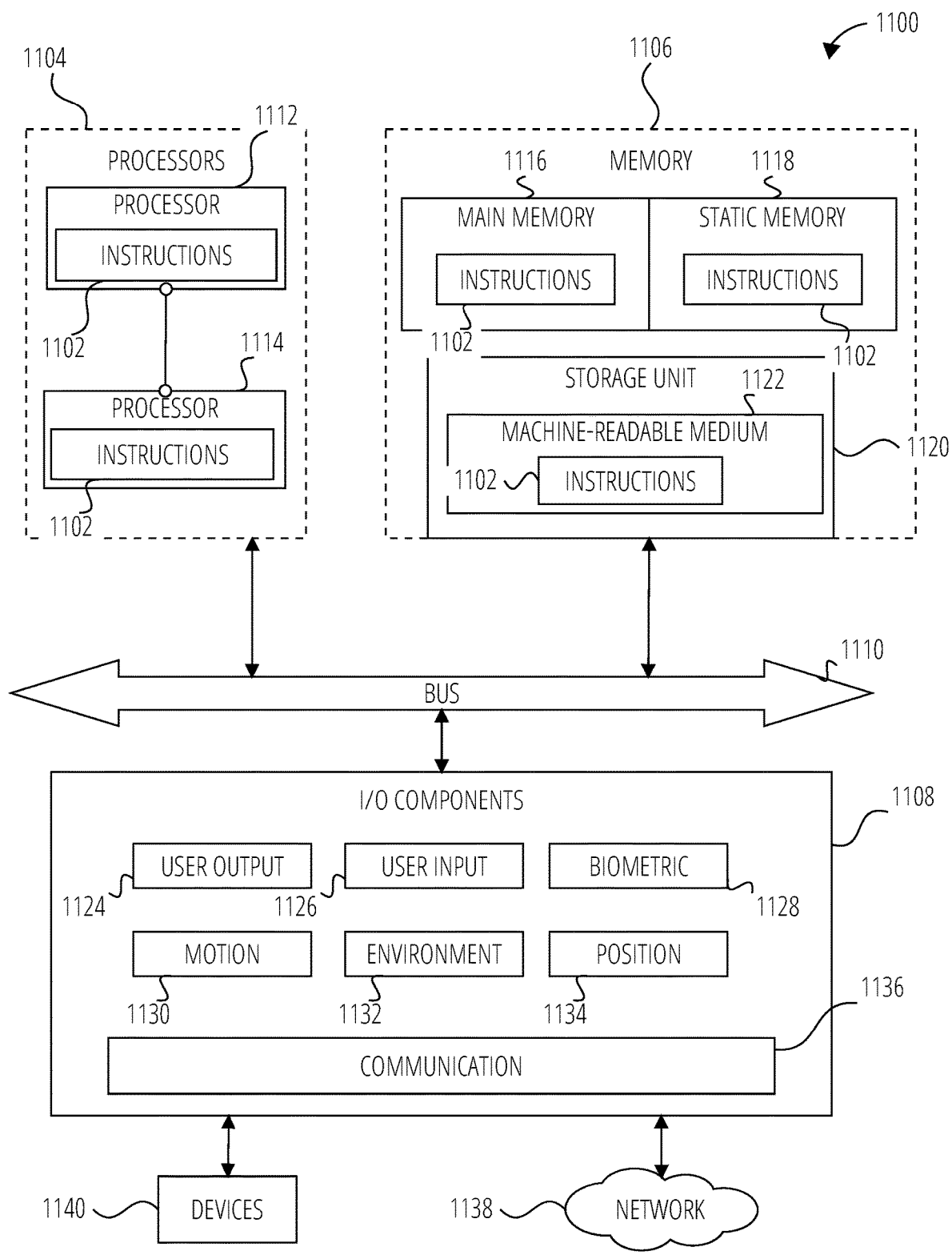
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may for example, be used to capture still images and video of a user of the user system 102 (e.g., "selfies"), which may then be augmented with augmentation data (e.g., filters) described above. The rear cameras may for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
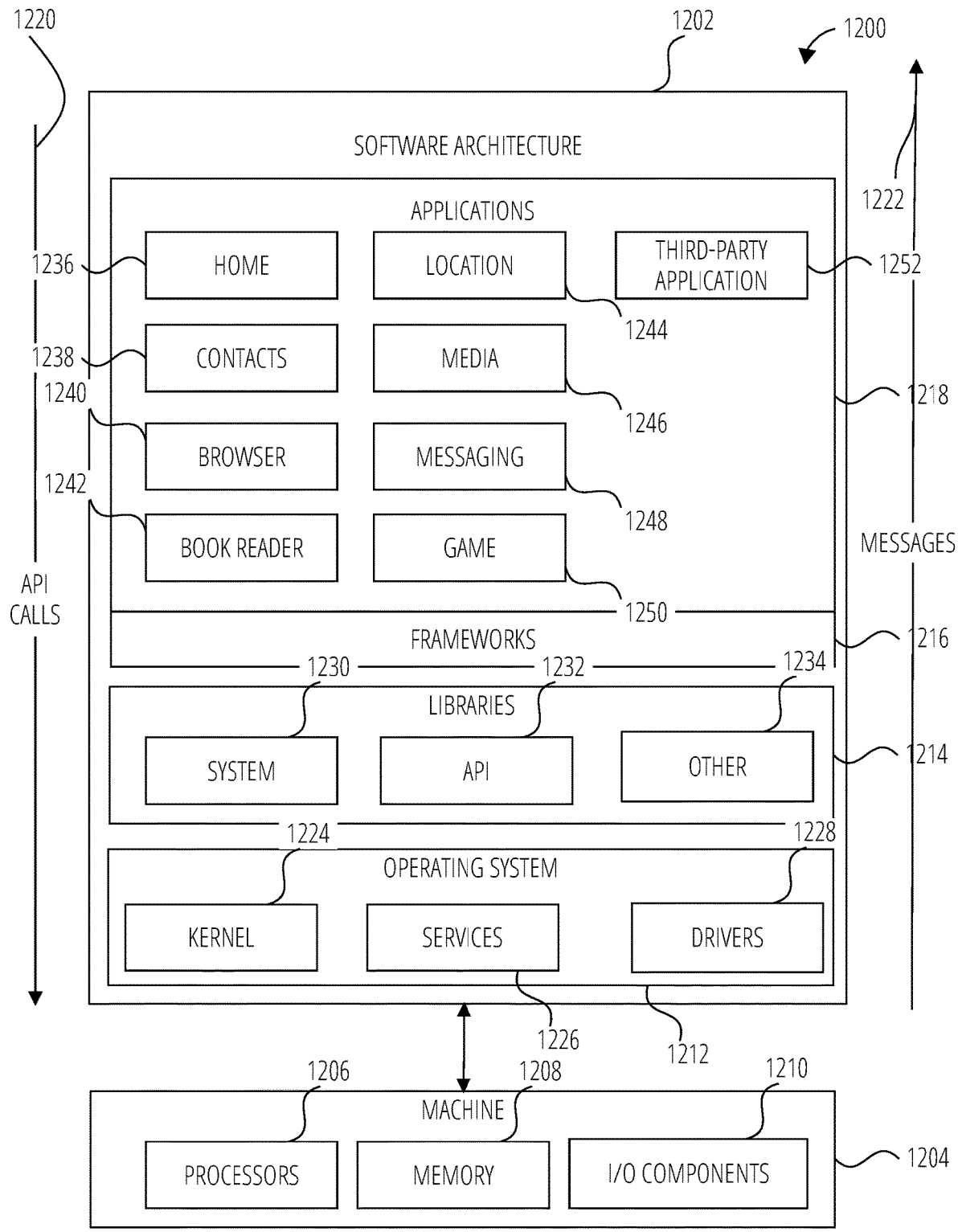
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

Conclusion

Present examples enable a user to benefit from the use of messaging modes that enable or encourage a reply or fuller participation in an online exchange of digital messages. In some aspects, the technical benefits and improved technology described herein address digital communication difficulties and drawbacks of conventional tools and platforms, and seek to provide easier ways for users to engage with each other in the digital world.

EXAMPLES

Thus, some embodiments may include one or more of the following examples.

Example 1. An interaction system comprising a processor; and a memory storing instructions that, when executed by the processor, configure the interaction system to receive, from a first user device, a user-selected rule for a messaging mode to be applied to a message sent from the first user device to a second user device; store the user-selected rule in a database; receive a request to send the message from the first user device to the second user device; access the database to retrieve the user-selected rule; based on the user-selected rule, apply the messaging mode to the message; and cause or facilitate a transmission of the message from the first user device to the second user device.

Example 2. The interaction system of example 1, wherein the messaging mode includes an obscuring of an aspect of the message sent from the first user device to the second user device.

Example 3. The interaction system of example 2, wherein the obscuring renders the aspect blurred, unreadable, invisible, or illegible to a user accessing the message at the second user device.

Example 4. The interaction system of example 3, wherein the user-selected rule includes a condition required to be satisfied by the user accessing the message at the second user device in order for the obscured aspect of the message to be unobscured and rendered unblurred, readable, visible, or legible to the user accessing the message at the second user device.

Example 5. The interaction system of example 4, wherein the obscured aspect of the message includes an image.

Example 6. The interaction system of example 5, wherein the condition required to be satisfied includes a receipt by the first user device of a reply to the message, the reply composed by the user accessing the message at the second user device and sent from the second user device.

Example 7. The interaction system of example 6, wherein the condition required to be satisfied further requires receipt of an image to be included in the reply to the message composed by the user accessing the message at the second user device.

Example 8. The interaction system of example 7, wherein the instructions further configure the interaction system to obscure the obscured aspect of the message based on a receipt by the first user device of a reply to the message, the reply to the message including an image thereby satisfying the condition required to be satisfied in order for the obscured aspect of the message to be unobscured.

Example 9. A method, at an interaction system, comprising receiving, from a first user device, a user-selected rule for a messaging mode to be applied to a message sent from the first user device to a second user device; storing the user-selected rule in a database; receiving a request to send the message from the first user device to the second user device; accessing the database to retrieve the user-selected rule; based on the user-selected rule, applying the messaging mode to the message; and causing or facilitating a transmission of the message from the first user device to the second user device.

Example 10. The method of example 9, wherein the messaging mode includes an obscuring of an aspect of the message sent from the first user device to the second user device.

Example 11. The method of example 10, wherein the obscuring renders the aspect blurred, unreadable, invisible, or illegible to a user accessing the message at the second user device.

Example 12. The method of example 11, wherein the user-selected rule includes a condition required to be satisfied by the user accessing the message at the second user device in order for the obscured aspect of the message to be unobscured and rendered unblurred, readable, visible, or legible to the user accessing the message at the second user device.

Example 13. The method of example 12, wherein the obscured aspect of the message includes an image.

Example 14. The method of example 13, wherein the condition required to be satisfied includes a receipt by the first user device of a reply to the message, the reply composed by the user accessing the message at the second user device and sent from the second user device.

Example 15. The method of example 14, wherein the condition required to be satisfied further requires receipt of an image to be included in the reply to the message composed by the user accessing the message at the second user device.

Example 16. The method of example 15, further comprising obscuring the obscured aspect of the message based on a receipt by the first user device of a reply to the message, the reply to the message including an image thereby satisfying the condition required to be satisfied in order for the obscured aspect of the message to be unobscured.

Example 17. A non-transitory computer-readable storage medium, the computer-readable storage medium including instructions that when executed by a computer, cause the computer to receive, from a first user device, a user-selected rule for a messaging mode to be applied to a message sent from the first user device to a second user device; store the user-selected rule in a database; receive a request to send the message from the first user device to the second user device; access the database to retrieve the user-selected rule; based on the user-selected rule, apply the messaging mode to the message; and cause or facilitate a transmission of the message from the first user device to the second user device.

Example 18. The computer-readable storage medium of example 17, wherein the messaging mode includes an obscuring of an aspect of the message sent from the first user device to the second user device.

Example 19. The computer-readable storage medium of example 18, wherein the obscuring renders the aspect blurred, unreadable, invisible, or illegible to a user access the message at the second user device.

Example 20. The computer-readable storage medium of example 19, wherein the user-selected rule includes a condition required to be satisfied by the user access the message at the second user device in order for the obscured aspect of the message to be unobscured and rendered unblurred, readable, visible, or legible to the user accessing the message at the second user device.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. An interaction system comprising:
   at least one processor; and
   a memory storing instructions that, when executed by the at least one processor, configure the interaction system to:
   receive, from a first user device, a user-selected rule for a messaging mode to be applied to a message sent from the first user device to a second user device;
   store the user-selected rule in a database;
   receive a request to send the message from the first user device to the second user device;
   access the database to retrieve the user-selected rule;
   based on the user-selected rule, apply the messaging mode to the message; and
   cause or facilitate a transmission of the message from the first user device to the second user device;
   wherein the messaging mode includes an obscuring of an aspect of the message sent from the first user device to the second user device;
   wherein the obscuring renders the aspect blurred, unreadable, invisible, or illegible to a user accessing the message at the second user device;
   wherein the user-selected rule includes a condition required to be satisfied by the user accessing the message at the second user device in order for the obscured aspect of the message to be unobscured and rendered unblurred, readable, visible, or legible to the user accessing the message at the second user device;
   wherein the obscured aspect of the message includes an image;
   wherein the condition required to be satisfied includes a receipt by the first user device of a reply to the message, the reply composed by the user accessing the message at the second user device and sent from the second user device, wherein the condition required to be satisfied further requires receipt of an image to be included in the reply to the message composed by the user accessing the message at the second user device; and
   wherein the instructions further configure the interaction system to obscure the obscured aspect of the message based on a receipt by the first user device of the reply to the message, the reply to the message including an image thereby satisfying the condition required to be satisfied in order for the obscured aspect of the message to be unobscured.

2. The interaction system of claim 1, wherein the message includes a message text payload.

3. The interaction system of claim 1, wherein the message includes a message audio payload.

4. The interaction system of claim 1, wherein the message includes message augmentation data.

5. The interaction system of claim 1, wherein the message includes a message duration parameter.

6. The interaction system of claim 1, wherein the message includes a message geolocation parameter.

7. The interaction system of claim 1, wherein the message includes a message story identifier.

8. A method, at an interaction system, comprising:
   receiving, from a first user device, a user-selected rule for a messaging mode to be applied to a message sent from the first user device to a second user device;
   storing the user-selected rule in a database;
   receiving a request to send the message from the first user device to the second user device;
   accessing the database to retrieve the user-selected rule;
   based on the user-selected rule, applying the messaging mode to the message; and
   causing or facilitating a transmission of the message from the first user device to the second user device;
   wherein the messaging mode includes an obscuring of an aspect of the message sent from the first user device to the second user device;
   wherein the obscuring renders the aspect blurred, unreadable, invisible, or illegible to a user accessing the message at the second user device;
   wherein the user-selected rule includes a condition required to be satisfied by the user accessing the message at the second user device in order for the obscured aspect of the message to be unobscured and rendered unblurred, readable, visible, or legible to the user accessing the message at the second user device;
   wherein the obscured aspect of the message includes an image;
   wherein the condition required to be satisfied includes a receipt by the first user device of a reply to the message, the reply composed by the user accessing the message at the second user device and sent from the second user device, wherein the condition required to be satisfied further requires receipt of an image to be included in the reply to the message composed by the user accessing the message at the second user device; and
   obscuring the obscured aspect of the message based on a receipt by the first user device of the reply to the message, the reply to the message including an image thereby satisfying the condition required to be satisfied in order for the obscured aspect of the message to be unobscured.

9. The method of claim 8, wherein the message includes a message text payload.

10. The method of claim 8, wherein the message includes a message audio payload.

11. The method of claim 8, wherein the message includes message augmentation data.

12. The method of claim 8, wherein the message includes a message duration parameter.

13. The method of claim 8, wherein the message includes a message geolocation parameter.

14. The method of claim 8, wherein the message includes a message story identifier.

15. A non-transitory computer-readable storage medium, the computer-readable storage medium including instructions that when executed by a computer, cause the computer to:
    receive, from a first user device, a user-selected rule for a messaging mode to be applied to a message sent from the first user device to a second user device;
    store the user-selected rule in a database;
    receive a request to send the message from the first user device to the second user device;
    access the database to retrieve the user-selected rule;
    based on the user-selected rule, apply the messaging mode to the message; and
    cause or facilitate a transmission of the message from the first user device to the second user device;
    wherein the messaging mode includes an obscuring of an aspect of the message sent from the first user device to the second user device;

wherein the obscuring renders the aspect blurred, unreadable, invisible, or illegible to a user accessing the message at the second user device;

wherein the user-selected rule includes a condition required to be satisfied by the user accessing the message at the second user device in order for the obscured aspect of the message to be unobscured and rendered unblurred, readable, visible, or legible to the user accessing the message at the second user device;

wherein the obscured aspect of the message includes an image;

wherein the condition required to be satisfied includes a receipt by the first user device of a reply to the message, the reply composed by the user accessing the message at the second user device and sent from the second user device, wherein the condition required to be satisfied further requires receipt of an image to be included in the reply to the message composed by the user accessing the message at the second user device; and wherein the instructions further configure an interaction system to obscure the obscured aspect of the message based on a receipt by the first user device of the reply to the message, the reply to the message including an image thereby satisfying the condition required to be satisfied in order for the obscured aspect of the message to be unobscured.

16. The non-transitory computer-readable storage medium of claim 15, wherein the message includes a message text payload.

17. The non-transitory computer-readable storage medium of claim 15, wherein the message includes a message audio payload.

18. The non-transitory computer-readable storage medium of claim 15, wherein the message includes message augmentation data.

19. The non-transitory computer-readable storage medium of claim 15, wherein the message includes a message duration parameter.

20. The non-transitory computer-readable storage medium of claim 15, wherein the message includes a message geolocation parameter.

21. The non-transitory computer-readable storage medium of claim 15, wherein the message includes a message story identifier.

* * * * *